June 15, 1937.    B. W. HENNING    2,083,842
COUPLING DEVICE
Filed April 21, 1934    2 Sheets-Sheet 1
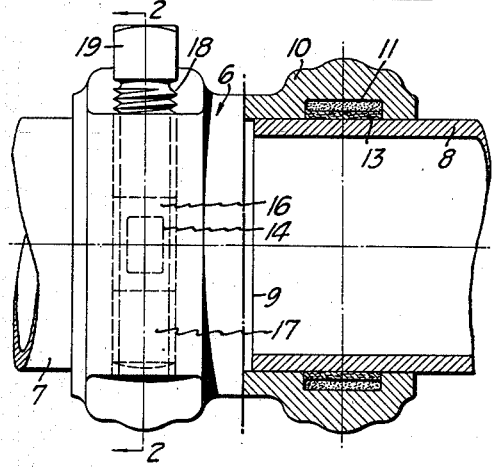
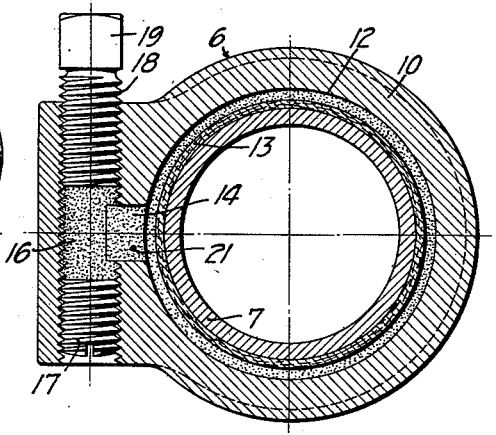
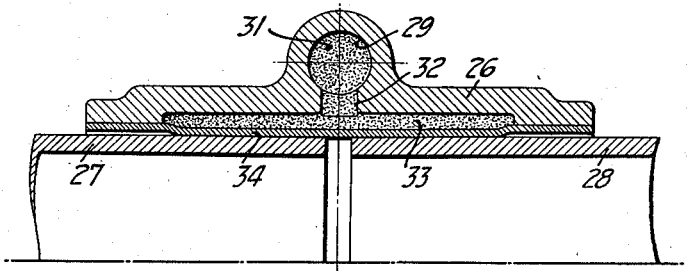
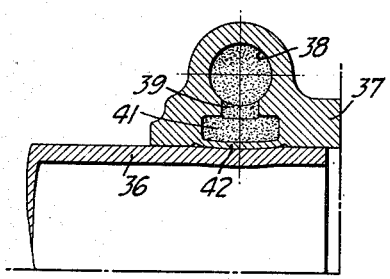
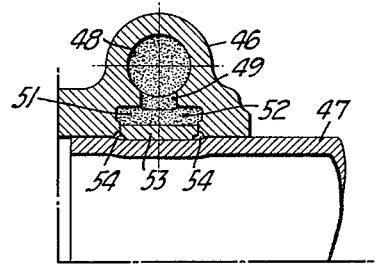
INVENTOR
Bruno W. Henning
BY
ATTORNEY

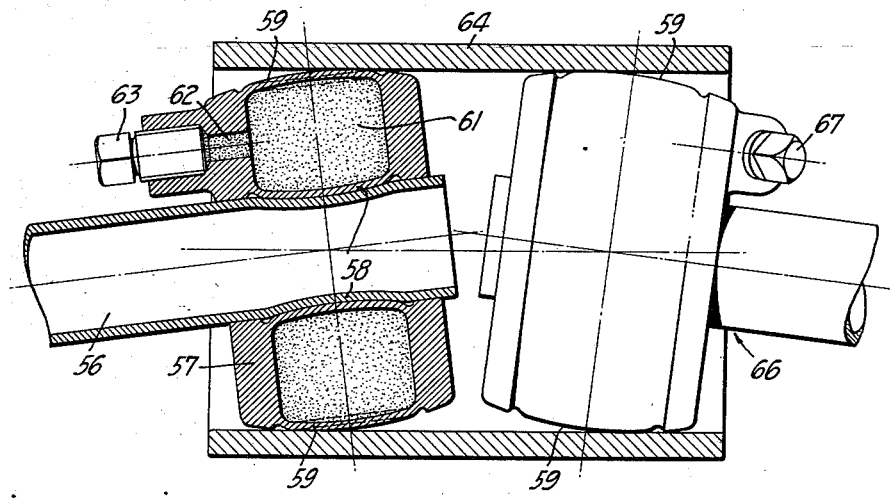
FIG_6_

Patented June 15, 1937

2,083,842

UNITED STATES PATENT OFFICE 2,083,842

COUPLING DEVICE

Bruno W. Henning, San Francisco, Calif.

Application April 21, 1934, Serial No. 721,686

2 Claims. (Cl. 285—193)

My invention relates to a device which often takes the form of a coupling or collar. The major characteristic depends upon a decrease of volume of the coupling and an accompanying predetermined distortion of any of the confining walls thereof due to cumulative pressure produced by a screw or plunger upon a plastic or flowing medium within those walls. If the relatively weaker wall is so forced to yield into abutment with a resisting surface, a tight joint, grip or bond will result. The invention can be adapted to a great number of uses, for instance, for pipe tube or conduit couplings, shaft couplings, expanding washers under large nuts, for pipe fittings of all descriptions, for covers for air-tight containers, for valve seats, for expansion and ball joints, as adjustable metal packings for piston rods, for taking up wear in bronze or Babbitt bearings on line shafting, and other comparable uses. The gripping action can be used to grip against linear movement or against rotary movement and can be applied between parallel resisting surfaces.

An object of my invention is to provide an improved coupling for engaging with and fastening upon a generally cylindrical object such a pipe.

Another object of my invention is to provide a coupling which can be firmly secured to a pipe without pre-treating the pipe.

The foregoing and other objects are attained in the embodiment of the invention illustrated in the drawings, in which—

Fig. 1 on the left half is a side elevation of part of a coupling constructed in accordance with my invention, and on the right half is a cross-section on an axial vertical plane through a coupling of my invention.

Fig. 2 is a cross-section the plane of which is indicated by the line 2—2 of Fig. 1.

Fig. 3 is a cross-section on an axial plane, of a modified form of coupling in accordance with my invention.

Fig. 4 is a cross-section on an axial plane of a further modified form of coupling in accordance with my invention.

Fig. 5 shows a cross-section on an axial plane, of part of a further modified form of coupling of my invention.

Fig. 6 shows an angular joint made by the use of the coupling of my invention, the portion of the joint on the left being in cross-section on an axial plane, while the portion of the joint on the right is in elevation.

The coupling device of my invention preferably includes a relatively stiff body having an annular chamber therein adapted to contain fluid, one or more of the bounding walls of the chamber being flexible so that they can be displaced to constrict on or expand in a pipe by increase of pressure in the fluid.

As an illustrative example, there is disclosed in Figs. 1 and 2 a coupling, generally designated 6, for joining a pair of pipes 7 and 8, respectively, which are circular-cylindrical in exterior contour and terminate with transverse faces 9 in close proximity. Surrounding the termini of the pipes I provide a body 10 which is generally of annular form and is constructed of suitable material, such as metal, with the walls of sufficient thickness as to be relatively stiff. The body 10 is provided with a pair of annular chambers 11 and 12 respectively, within each of which is seated a yieldable wall 13 which forms a boundary for the chambers 11 and 12. The wall in the present instance can be of any suitable material, either thin metal or a textile or rubber material.

In order that the clamp or coupling can grasp the pipe tightly, each of the chambers 11 and 12 is provided with an extension 14 leading onto a cylinder 16 the lower end of which is closed by a permanently placed plug 17 and the upper end of which carries a screw 18 having a head 19 designed to receive any suitable operating mechanism. Within each one of the chambers 11 and 12, and within the passages 14 and 16, I provide a suitable fluid material 21 which can be any appropriate and readily mobile substance, such as oil, or a cementitious material which ultimately can set, or any plastic such as putty. After the device is put in place by being slipped over the ends of the pipes 7 and 8, suitable manipulation of the screw 18 increases the pressure of the fluid 21 and constricts the band 13 around the pipe 8, for instance. Such constriction is often sufficient to reduce or neck down slightly the diameter of the pipe, to such an extent that the coupling is very firmly held in place on the pipe.

As shown in Fig. 3, instead of having a pair of chambers 11 and 12 with a separate band 13, I can provide a body 26 which spans two pipes 27 and 28 and contains a cylinder 29 for forcing a plastic material 31 through a passage 32 into an annular chamber 33. One wall of the chamber is bounded by an inserted, relatively flexible cylindrical sleeve 34, the opposite ends of which are suitably fastened, as by soldering, to the body 26, whereas the intermediate portion can be constricted upon an increase of pressure in the fluid material to bear very tightly against the walls of the pipes 27 and 28.

As a further modification, disclosed in Fig. 4, the pipe 36 can be introduced into a suitable relatively stiff body 37 provided with a fluid cylinder 38 and a passage 39 communicating with an annular chamber 41, and can also be provided with an integrally formed, relatively thin, flexible wall 42 which will yield under a sufficiently high pressure so as to assume the shape shown in Fig. 4 and to neck down the pipe 36.

In Fig. 5 there is illustrated an additionally modified form comparable to the form shown in Fig. 4, but in which the relatively stiff cast-iron body 46 encompasses a pipe 47. Within the body 46 is a displacement cylinder 48 communicating through a passage 49 with an annular chamber 51 which contains a suitable fluid material 52. One wall of the chamber is bounded by a band 53 which originally is cast integrally with the remainder of the body, but which, under the pressure exerted by the fluid material, is sufficiently frangible at weakened zones provided by grooves 54 as to rupture. The band 53 is therefore permanently displaced into a constricted position about the pipe. This coupling can ordinarily be removed only by shattering the entire coupling or by cutting with a torch.

To illustrate the versatility of my invention, I have shown in Fig. 6 a coupling which may be utilized as an elbow. A supply pipe 56, for instance, is introduced into a relatively stiff annular body 57 having an interior yieldable wall 58 and an exterior yieldable wall wall 59. The walls 58 and 59 can be constructed in accordance with any of the expedients mentioned heretofore. Each of them serves its part in partially bounding an interior annular chamber 61 communicating through a passage 62 with a screw 63. This screw is arranged parallel with the pipe 56. Upon increase in pressure within the chamber 61, due to contraction of the volume thereof, the inner wall 58 is displaced to assume the contour shown in Fig. 6, while the exterior wall 59 is expanded into tight engagement with an outer sleeve 64. A comparable assembly 66 at the other end of the sleeve 64 provides a tight joint there, and since the walls 59 assume a generally spherical form a tight engagement is made interiorly and exteriorly of the body 57. In the assembly at the right of Fig. 6, the screw 67 is inclined at an angle to the axis of the pipe 66, in order to be within the confines of the structure. This arrangement is of course suitable for a straight line connection and for a wide degree of angularity between the pipes 56 and 66 as well.

The coupling as described herein and its mechanism for application are such that a very strong union can be made between the pipe and the coupling without any leakage being present and, if a permanent attachment is to be made, with the displacement liquid such that it can ultimately harden or set to make a lasting and, to all intents and purposes, integral construction. On the other hand, if simply a temporary attachment is desired, the liquid is preferably of a character so that the coupling can readily be removed when the pressure is lowered.

I claim:

1. A coupling device comprising a relatively stiff body having a chamber therein, a frangible wall in the form of a band forming part of the boundary of said chamber, and means for displacing fluid in said chamber to detach said wall from said body.

2. A coupling device for use on a pipe, comprising a relatively stiff body having a chamber therein, a yielding wall in the form of a band forming part of the boundary of said chamber, and means for hydraulically contracting said band to produce in said pipe a permanent peripheral groove within which said band is seated.

BRUNO W. HENNING.